US 6,553,371 B2

(12) United States Patent
Gutierrez-Rivas et al.

(10) Patent No.: US 6,553,371 B2
(45) Date of Patent: Apr. 22, 2003

(54) METHOD AND SYSTEM FOR SPECIFYING AND DISPLAYING TABLE JOINS IN RELATIONAL DATABASE QUERIES

(75) Inventors: Humberto Gutierrez-Rivas, Rochester, NY (US); Fernando Cardoso Ismerio, Aptos, CA (US); Brian Gerrit Payton, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 09/960,574

(22) Filed: Sep. 20, 2001

(65) Prior Publication Data

US 2003/0055830 A1 Mar. 20, 2003

(51) Int. Cl.[7] .............................................. G06F 17/30
(52) U.S. Cl. .............................. 707/3; 707/4; 707/103 R
(58) Field of Search .............................. 707/1, 2, 3, 4, 707/103 R

(56) References Cited

U.S. PATENT DOCUMENTS

| 5,428,776 | A | * | 6/1995 | Rothfield ........................ 707/4 |
| 5,519,859 | A | * | 5/1996 | Grace ............................. 707/3 |
| 5,594,898 | A | | 1/1997 | Dalal et al. ..................... 707/2 |
| 5,619,688 | A | | 4/1997 | Bosworth et al. ............... 707/4 |
| 5,761,654 | A | * | 6/1998 | Tow ............................... 707/2 |
| 5,802,514 | A | * | 9/1998 | Huber ............................ 707/4 |
| 5,950,190 | A | * | 9/1999 | Yeager et al. .................. 707/3 |
| 6,016,488 | A | | 1/2000 | Bosworth et al. ............... 707/4 |
| 6,189,012 | B1 | * | 2/2001 | Mital et al. ............. 707/103 R |
| 6,208,985 | B1 | * | 3/2001 | Krehel ........................... 707/3 |
| 6,356,896 | B1 | * | 3/2002 | Cheng et al. .................. 707/4 |

* cited by examiner

Primary Examiner—Diane D. Mizrahi
Assistant Examiner—Yicun Wu
(74) Attorney, Agent, or Firm—Sandra M. Parker Esq.

(57) ABSTRACT

A system, a program storage device and a software method, useable in a computer database system with a display device, is provided for displaying and selecting table joins. The method is capable of assisting in a user's selection of a table join by displaying all user-selected database tables in a join overview diagram and automatically inferring and displaying in a join grid each join grid row having a potential valid table join for a pair of user-selected database tables. The method accepts the user's selection of a join grid row from the join grid, and, in response, places a join indicator in the join overview diagram between icons representing the pair of user-selected database tables from the user-selected join grid row. The user's join grid row selection is performed with a single operation.

21 Claims, 5 Drawing Sheets

| Join? | Table | Column | Operator | Table | Column | Join Type |
|---|---|---|---|---|---|---|
| ✓ | EMP_RESUME | EMPNO | = | EMPLOYEE | EMPNO | INNER JOIN ▶ |
| ✓ | EMP_RESUME | PHOTONUM | = | EMP_PHOTO | NUMBER | INNER JOIN ▶ |
| ✓ | EMPLOYEE | DEPT | = | DEPARTMENT | CODE | INNER JOIN ▶ |
| ✓ | EMPLOYEE | QUOTA | = | SALES | PROJECTED | INNER JOIN ▶ |
| ✓ | DEPARTMENT | ORG | = | ORG | NAME | INNER JOIN ▶ |

FIG. 2

METHOD AND SYSTEM FOR SPECIFYING AND DISPLAYING TABLE JOINS IN RELATIONAL DATABASE QUERIES

BACKGROUND OF THE INVENTION

1. Field of the Invention

This invention relates in general to database management systems performed by computers, and in particular to the selection and display of table joins in relational database management system queries.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

One of the most common SQL queries executed by RDBMS software is the SELECT statement. In the SQL standard, the SELECT statement generally has the format: "SELECT<clause> FROM<clause> WHERE<clause> GROUP BY<clause> HAVING<clause> ORDER BY <clause>." The clauses generally must follow this sequence. Only the SELECT and FROM clauses are required and all other clauses are optional.

Generally, the result of a SELECT statement is a subset of data retrieved by the RDBMS software from one or more existing tables stored in the relational database, wherein the FROM clause identifies the name of the table or tables from which data is being selected. The subset of data is treated as a new table, termed the result table. The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specifies a comparison between two values from certain columns, constants or correlated values. Multiple predicates in the WHERE clause are typically connected by Boolean operators.

Another operation permitted by SQL is the JOIN operation, which concatenates horizontally all or parts of two or more tables to create a new resulting table. The JOIN operation is implied by naming more than one table in the FROM clause of a SELECT statement, although it may also be performed on the same table, as defined in the SQL standard operation named a self-join.

In order to specify a query with joins for a relational database involving more than one source table, column pairs from different tables need to be identified to describe how these tables are to be joined. It can be difficult to define the joins when the query involves a large number of columns. Therefore, it is desirable to use a graphical display tool as an interface between the user and the database, for visually indicating a join query.

There are many conventional products that assist the user in specifying valid relational joins, such as MS Access, Brio, IBM SQL Assist, etc. The effectiveness of these products decreases as number of joins, tables and columns increases. In most conventional products the users have to specify a join themselves, usually by dragging a column of one table to a column of another table. Moreover, once the represented tables are larger than the viewing area, this method becomes cumbersome.

Therefore, there is a need to provide a method and a graphical display tool as an interface between the user and the database, which can automatically specify and visually indicate all possible and valid joins, and make them available for user's selection. This would simplify the design, development, and maintenance of applications and provide more reliable applications.

SUMMARY OF THE INVENTION

The foregoing and other objects, features, and advantages of the present invention will be apparent from the following detailed description of the preferred embodiments which makes reference to several drawing figures.

One preferred embodiment of the present invention includes a software method, useable in a computer database system with a display device, for displaying and selecting table joins. The method is capable of assisting in a user's selection of a table join by displaying all user-selected database tables in a join overview diagram and automatically inferring and displaying in a join grid each join grid row having a potential valid table join for a pair of user-selected database tables. The method accepts the user's selection of a join grid row from the join grid, and, in response, places a join indicator in the join overview diagram between icons representing the pair of users elected database tables from the user-selected join grid row. The user's join grid row selection is performed with a single operation. Each row of the join grid represents a join column of a first table, a join column of a second table, and a join criteria, such as a join operator and a join type, indicating a way that the first table and the second table are to be joined by the selected join columns. The join overview diagram shows an overview of all tables selected in the query, and the joins currently available or selected for the selected database tables. The method assists the user in creating a user-defined table join by selecting elements from drop-down list boxes of an empty join grid row, and displaying the user-defined table join in the join grid and the join overview diagram.

Another preferred embodiment of the present invention is a system implementing the abovementioned method embodiment of the present invention. Yet another preferred embodiment of the present invention is a program storage device readable by a computer tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout:

FIG. 2 illustrates a table join grid and a join overview diagram, according to the preferred embodiments of the present invention;

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized, and structural and functional changes may be made without departing from the scope of the present invention.

The present invention is directed to a system, method and computer program storage device embodying a program of instructions executable by a computer to perform the method of the present invention creating a user interface for constructing database queries with joins, to be executed by a database engine to make changes to data in a database. In order to specify a query with a join for a database involving more than one source table, firstly the tables have to be chosen by a user. Then, the user interface of the present invention analyzes the selected tables and identifies column pairs that would produce valid join queries. The preferred embodiments of the present invention provide a graphical display tool as an interface between the user and a DBMS, for providing a human user with assistance in constructing and visually indicating a join query by displaying all system-proposed valid table joins. The present invention overcomes the scalability problem of solutions currently used in the industry and is much more user friendly.

Figure 1:
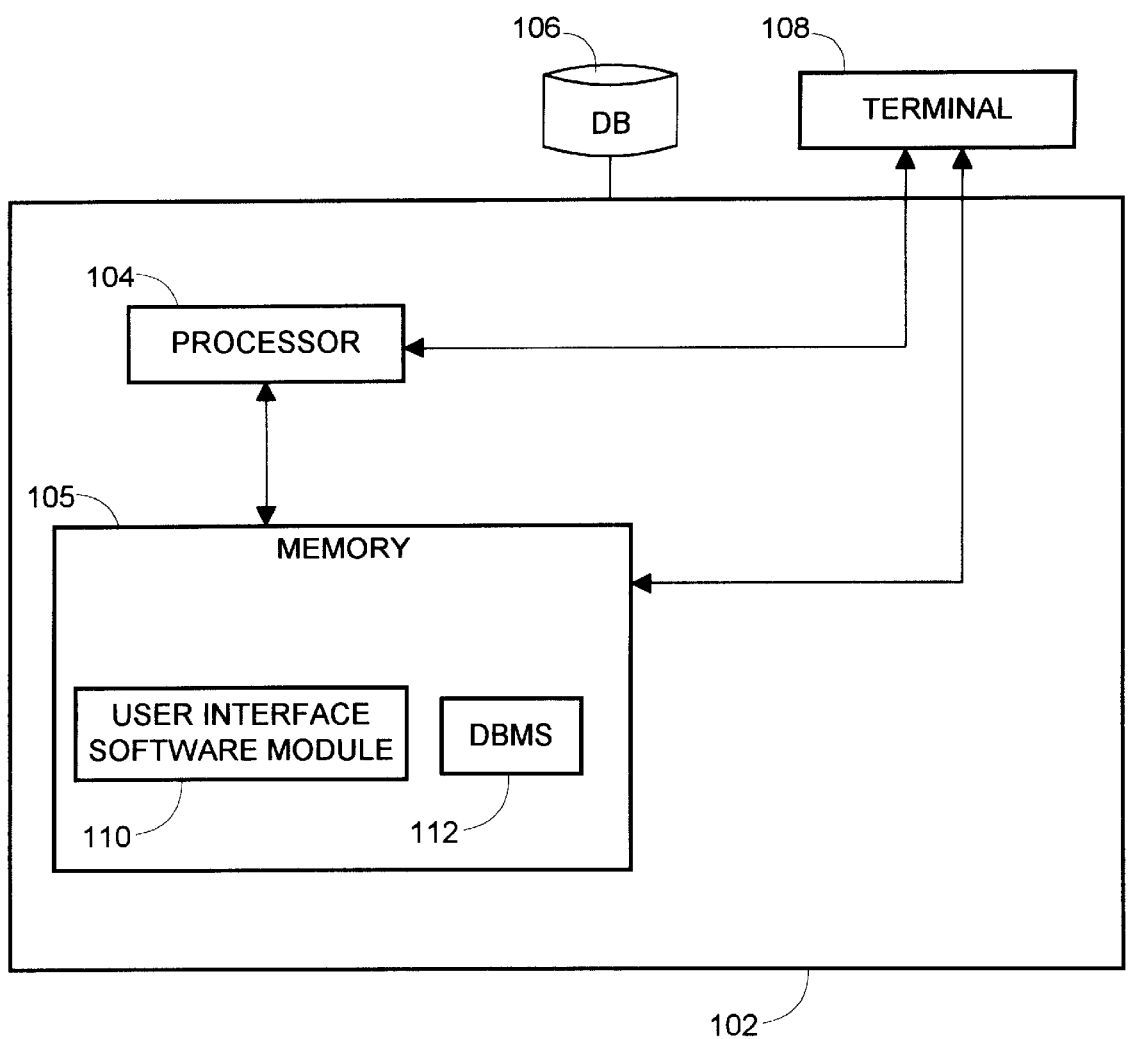
FIG. 1 illustrates a computer hardware and software environment usable in the present invention.

FIG. 1 illustrates an exemplary computer hardware environment that could be used with the present invention. Those skilled in the art will recognize that any combination of components, including computer hardware, peripherals and other devices, computer system software programs and application programs may be used to implement the present invention, so long as similar functions are performed thereby. Many modifications of the proposed preferred embodiments may be made without departing from the scope of the present invention.

In the exemplary environment, a computer system 102 is comprised of one or more processors 104 with a computer memory 105, connected to one or more electronic storage devices 106, such as disk drives, that store one or more relational databases. These drives may comprise, for example, optical disk drives, magnetic tapes and/or semiconductor memory. Each storage device permits receipt of a computer program storage device, such as a magnetic media diskette, magnetic tape, optical disk, semiconductor memory and other machine-readable storage device, and allows for method program steps recorded on the program storage device to be read and transferred into the computer memory 105. The recorded program instructions may include the code for the method embodiments of the present invention. Alternatively, the program steps can be received into the operating memory 105 from a computer over a network.

Operators of the computer system 102 use a standard operator terminal interface 108 with a graphical user interface, such as provided by Microsoft Windows, one of the UNIX GUIs or other similar interface, to transmit electrical signals to and from the computer system 102, that represent commands for performing various search and retrieval functions, termed queries, against the databases. In the present invention, these queries conform to the Structured Query Language (SQL) standard, and invoke functions performed by a DBMS 112, which is preferably a Relational DataBase Management System (RDBMS) software. In the preferred embodiment of the present invention, the RDBMS software is the DB2 product offered by IBM for the UNIX AIX operating system, as well as for HP-UX, Sun Solaris and Windows operating system. Those skilled in the art will recognize, however, that the present invention has application to any RDBMS software that uses SQL, and may similarly be applied to non-SQL queries.

A user interface software module 110 of the present invention is used to assist the user in selecting a table join query, via a keypad, mouse, etc, of the terminal interface 108. For this purpose it displays two elements on the terminal interface 108: a join grid 10 and a join overview diagram 30, as shown in FIG. 2. The join grid 10 is a join selection grid, having rows and columns, and presents a selection of all rows 12 with a potential, valid join column combination. A join check-box cell 14 can be set or reset in each row 12 to select a table join represented by that row 12. The rows 12 of the join grid 10 are inferred by the computer and created in the user interface software module 110 embodiment according to some criteria, and each row 12 with a potential and valid table join connects two joinable columns selected from the tables from the database. Thus, each row 12 has the detailed information about the two table columns that may be joined, and displays data in each table name cell 16, 18, each column name cell 20, 22, a join operator cell 24 and a join type cell 26, which describe the relationship between the columns of the row 12.

Figure 3:
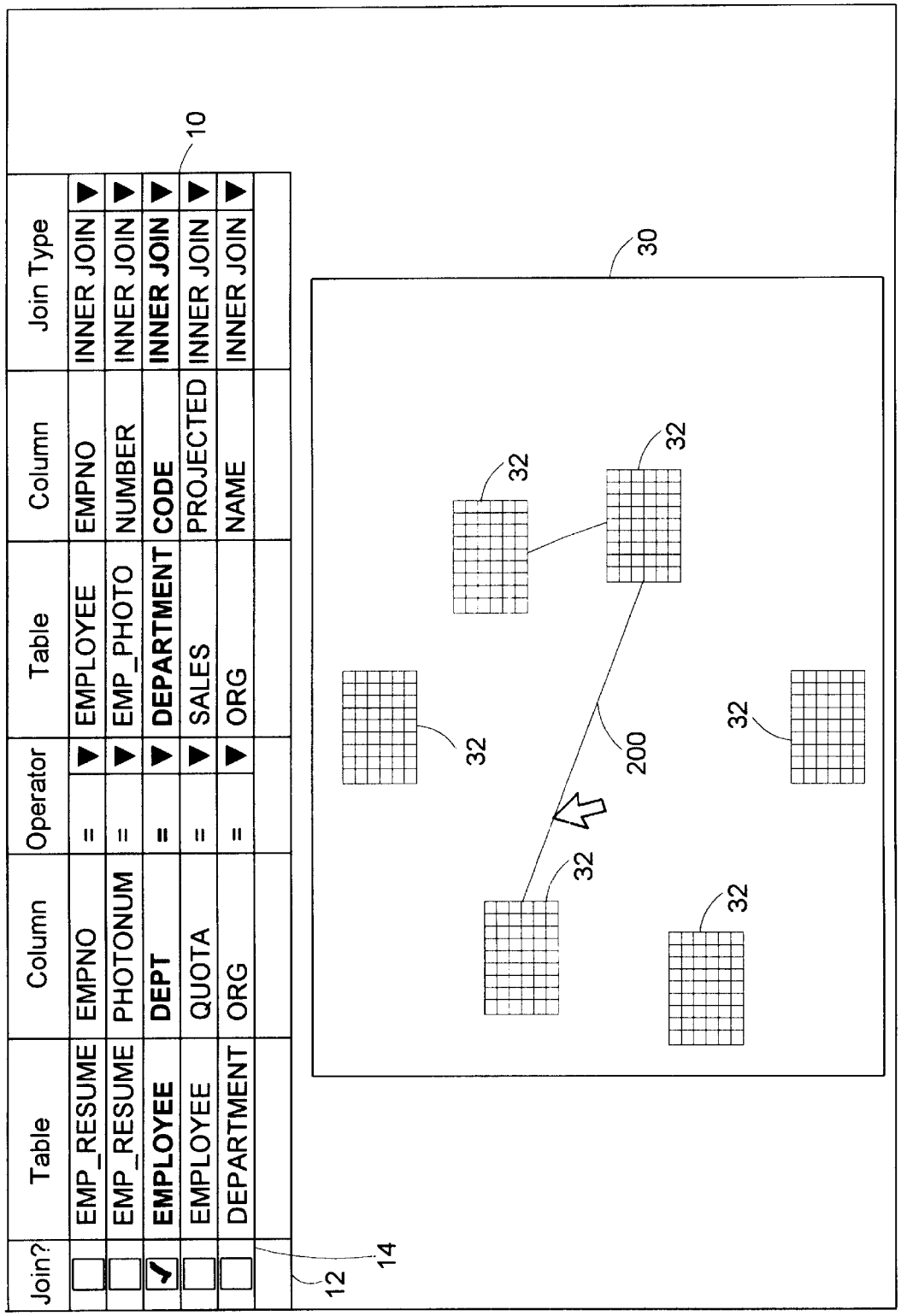
FIG. 3 illustrates a table join selected in the table join grid and the join overview diagram, according to the preferred embodiments of the present invention.

The join overview diagram 30 represents a graph of all database tables 32, represented as icons, which are selectable by the query. Join indicators for all possible, valid table joins between two tables 32 may be represented by lines 34, as shown in FIG. 2. FIG. 3 illustrates a join indicator line 34 for a selected table join, selected by setting the join check-box cell 14 of the join grid 10 of FIG. 3.

According to the preferred method embodiments of the present invention, the column name cell 20, 22 data, column data types, and some other database information, such as primary key and foreign key constraints, are used by the computer and the user interface software module 110 to determine and display all possible valid joins available to the user in his/her selection. In addition, the user can manually specify new joins through a secondary dialog box, as shown below. A click on the table 32 icon displays the table name, as shown in FIG. 2.

One of the advantages of the present invention is that the join grid 10 information and the join overview diagram 30 are always displayed together and are synchronized. Hence, if a user chooses a join in the join grid 10 by clicking on the join check-box cell 14, as shown in FIG. 3, the join overview diagram 30 automatically reflects the selection by drawing the line 34, which highlights the associated row 12 in the join grid 10. Moreover, each row of the join grid 10 automatically provides a summary of all two-column combinations of the selected two tables of the database, which are available as potential, valid table joins. Thus, the user does not have to select each of the two columns separately, and to manually join them in some fashion; this is provided by the user interface software module 110 of the present invention.

Further, the join overview diagram 30 gives users a concise overview of all tables 32 in the FROM clause of the query, as well as the joins currently available or selected for those tables. Also, the join check-box cell 14 of the join grid 10 allows users to choose joins from a list of potential joins with a single operation, such as a mouse click. Moreover, the join grid 10 allows users to logically order (sort) join information by the selected table name cell 16, 18, column name cell 20, 22, operator cell 24 and join type cell 26 data, for easier selection. Further, the join grid 10 allows users to quickly modify the operator cell 24 and join type cell 26 data of a selected table join.

Figure 5:
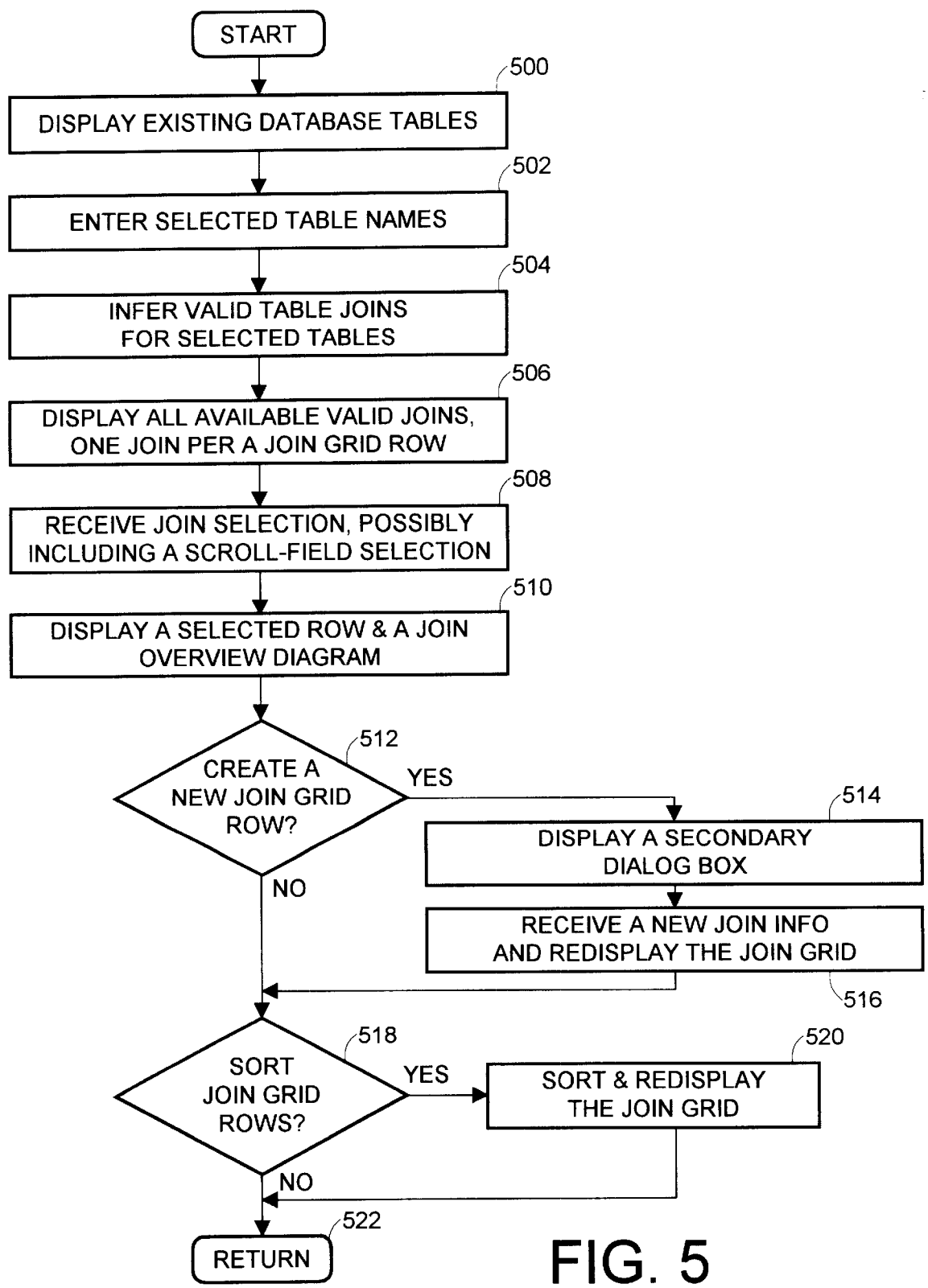
FIG. 5 is a flowchart illustrating the steps used for display and selection of a table join from the table join grid and the join overview diagram, according to the preferred embodiments of the present invention.

FIG. 5 is a flowchart illustrating the steps necessary for the proper utilization of the user interface software module 110, according to the preferred embodiments of the present invention. The method embodiment of the present invention includes the following steps. Firstly, in step 500 the user interface displays a list of all available tables for user's selection, in any conventional manner. In step 502 the system receives user-identified names of the tables to be joined.

In the method embodiment of the present invention, the user first selects two or more tables, i.e., as many as is participating in the query. Then, in step 504, the user interface software module 110 embodiment is invoked to determine by inference all potential join relationships. In step 506 all these potential join rows are displayed in the join grid 10, and the user interface module 110 creates and displays the join overview diagram 30, representing all tables 32, with lines connecting the tables with possible joins, as shown in FIG. 2. To select a join, in step 508 the user clicks on the join check-box cell 14 for a specific table join. FIG. 3 illustrates one such choice, where the third row 12 of the join grid 10 has been selected. The join check-box cell 14 displays a check mark. In next step 510, a join line 200 appears in the join overview diagram 30 between the graphical icons representing the two tables 32 participating in the selected join.

Figure 4:
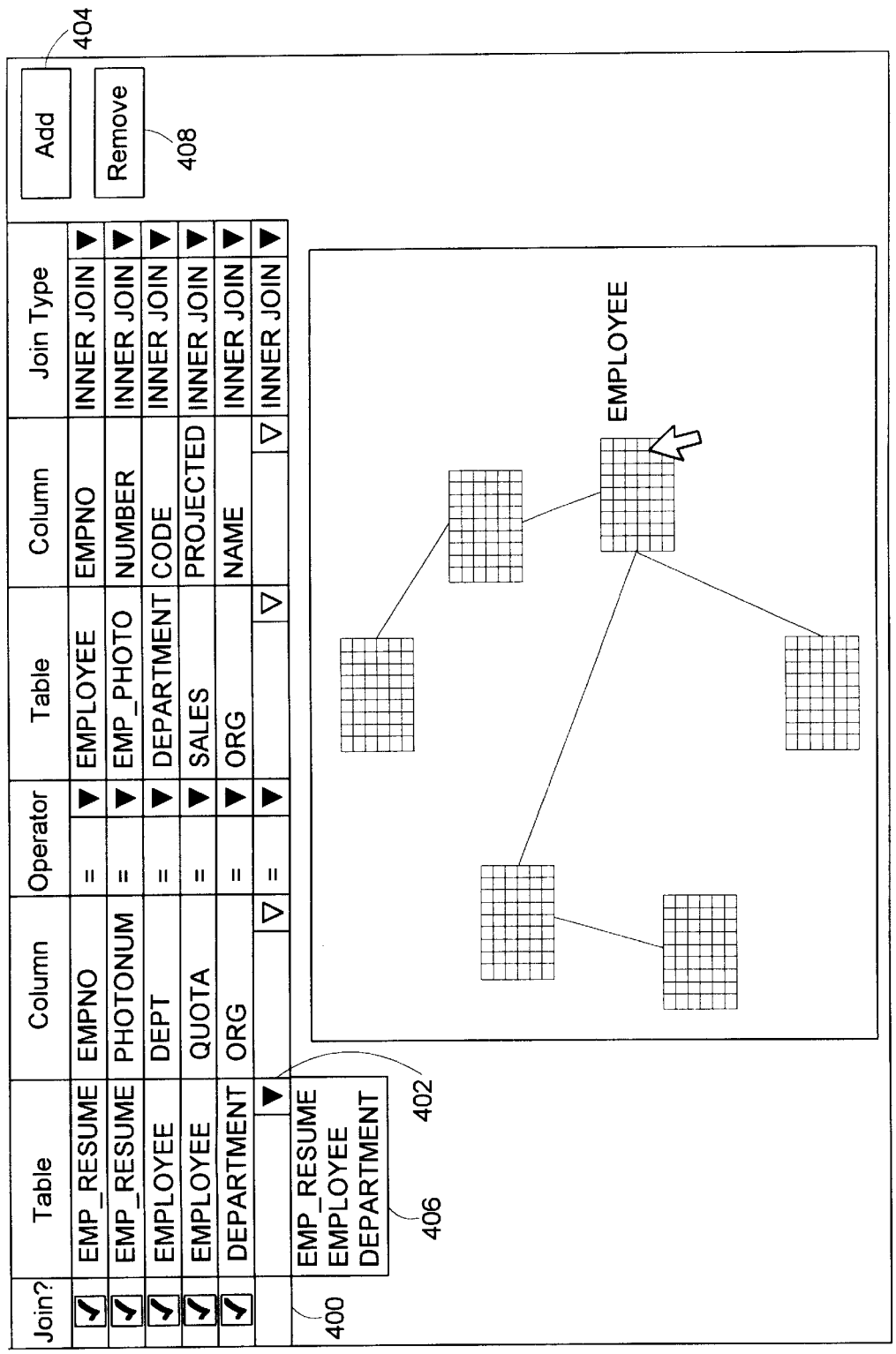
FIG. 4 illustrates an exemplary user interface display with buttons and drop-down buttons and list boxes, according to the preferred embodiments of the present invention.

FIG. 4 illustrates an exemplary user interface display with buttons, drop-down buttons and list boxes, according to the preferred embodiments of the present invention. A user-defined join grid row may be deleted by selecting a join grid row and pressing a Remove button 408 of FIG. 4. To create a new table join row, which will be represented in the join grid 10, a user would click on an Add button 404 in step 512. Next, in step 514, the user interface module 110 embodiment of the present invention creates drop-down list buttons 402 and drop-down list boxes 406 in the fields of an empty join grid row 400, which appears at the bottom of the join grid 10. In step 516 the system allows the user to select all the elements and criteria for the new table join, after which all the rows 12 of the join grid 10 are redisplayed.

To modify a join operator a user would click on a drop-down button 28 of the join operator cell 24 of FIG. 2 to create drop-down list fields for easy selection. To modify a join type, a user would click on a drop-down button 29 of the join type cell 26. The user can select a value from the join operator drop-down list (not shown) or a join type drop-down list (not shown), displayed by and stored by the user interface software module 110. The selected value appears in the join operator cell 24 or the join type cell 26. The user interface module 110 embodiment infers and displays, by default, equi-joins of the inner-join type. However, the user can modify the operator and type of a join, and can also select outer-join type queries by changing the selection using the drop-down buttons 28 and 29. This selection may be performed in step 508.

To sort the join information, in step 518 the user would click on a header of the appropriate column 20, 22 of the join grid 10. Then, the rows 12 in the join grid 10 are re-ordered by the user interface 110 embodiment of the present invention to place the values of the sorted column in an order, which may be the ascending order, and all the rows 12 are redisplayed in step 520. The user interface module 110 returns in step 522.

To view the details of the join line 200 of the join overview diagram 30, a user would click on the join line 200 in the diagram, between the graphical representation of the two tables 32, as shown in FIG. 3. The detailed information of the associated join will then become highlighted in the appropriate row 12 of the join grid 10. If the associated join row 12 is not visible in the display window, the rows of the join grid 10 will get scrolled to display the row 12 with the information.

The preferred embodiments of the present invention are very useful for developers of application software, such as relational database software. They are very efficient even for a large number of tables and columns, unlike the presently available products. In most of these conventional products users have to specify each join element separately, usually by "dragging" from one column of a table to a column of another table. Once the number of represented tables is larger than the display viewing area, this method becomes cumbersome.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A software method useable in a computer database system with a display device for inferring and displaying a selection of valid table joins for a relational database query specifying a plurality of user-selected database tables, the method comprising the following steps:

(a) assisting in a user's selection of a table join by displaying all user-selected database tables in a join overview diagram and automatically inferring and displaying in a join grid each join grid row having a potential valid table join for a pair of user-selected database tables;

(b) accepting the user's selection of a join grid row from the join grid; and (c) responsive to the user's selection of a join grid row from the join grid, placing a join indicator in the join overview diagram between icons representing the pair of user-selected database tables from the user-selected join grid row.

2. The method according to claim 1, wherein the user's selection of the join grid row being performed with a single operation.

3. The method according to claim 1, wherein each said join grid row representing a first join column of a first table from the plurality of user-selected database tables, a second join column of a second table from the plurality of user-selected database tables, and a join criteria indicating the first table and the second table being joined by the first and second join columns.

4. The method according to claim 3, wherein the join criteria including a join operator and a join type, and being selectable from a drop-down list box.

5. The method according to claim 3, wherein the display device allowing logical ordering of all said join grid rows by the first and second table and column name, and the join criteria.

6. The method according to claim 1, wherein the join overview diagram showing icons of all user-selected database tables in the query, and all potential or selected valid table joins.

7. The method according to claim 1, further comprising a step for assisting the user in creating a user-defined table join by selecting elements from drop-down list boxes of an empty join grid row, and displaying said user-defined table join in the join grid and in the join overview diagram.

8. A system for inferring and displaying a selection of valid table joins for a relational database query specifying a plurality of user-selected database tables, comprising:
 a computer having a display device and an electronic storage device coupled thereto for storing a relational database, the query being performed by the computer to retrieve data from the relational database;
 means, performed by the computer, for assisting in a user's selection of a table join by displaying all user-selected database tables in a join overview diagram and automatically inferring and displaying in a join grid each join grid row having a potential valid table join for a pair of user-elected database tables;
 means, performed by the computer, accepting the user's selection of a join grid row from the join grid; and
 means, performed by the computer, responsive to the user's selection of a join grid row from the join grid for placing a join indicator in the join overview diagram between icons representing the pair of user-selected database tables from the user-selected join grid row.

9. The system according to claim 8, wherein the user's selection of the join grid row being performed with a single operation.

10. The system according to claim 8, wherein each said join grid row representing a first join column of a first table from the plurality of user-selected database tables, a second join column of a second table from the plurality of user-selected database tables, and a join criteria indicating the first table and the second table being joined by the first and second join columns.

11. The system according to claim 10, wherein the join criteria including a join operator and a join type, and being selectable from a drop-down list box.

12. The system according to claim 10, wherein the display device allowing logical ordering of all said join grid rows by the first and second table and column name, and the join criteria.

13. The system according to claim 8, wherein the join overview diagram showing icons of all user-selected database tables in the query, and all potential or selected valid table joins.

14. The system according to claim 8, further comprising a means for assisting the user in creating a user-defined table join by selecting elements from drop-down list boxes of an empty join grid row, and displaying said user-defined table join in the join grid and in the join overview diagram.

15. A program storage device readable by a computer tangibly embodying a program of instructions executable by the computer to perform method steps for inferring and displaying on a display device a selection of valid table joins for a relational database query specifying a plurality of user-selected database tables stored in an electronic storage device coupled to the computer, the method comprising the following steps:
 (a) assisting in a user's selection of a table join by displaying all user-selected database tables in a join overview diagram and automatically inferring and displaying in a join grid each join grid row having a potential valid table join for a pair of user-selected database tables;
 (b) accepting the user's selection of a join grid row from the join grid; and
 (c) responsive to the user's selection of a join grid row from the join grid, placing a join indicator in the join overview diagram between icons representing the pair of user-selected database tables from the user-selected join grid row.

16. The method according to claim 15, wherein the user's selection of the join grid row being performed with a single operation.

17. The method according to claim 15, wherein each said join grid row representing a first join column of a first table from the plurality of user-selected database tables, a second join column of a second table from the plurality of user-selected database tables, and a join criteria indicating the first table and the second table being joined by the first and second join columns.

18. The method according to claim 17, wherein the join criteria including a join operator and a join type, and being selectable from a drop-down list box.

19. The method according to claim 17, wherein the display device allowing logical ordering of all said join grid rows by the first and second table and column name, and the join criteria.

20. The method according to claim 15, wherein the join overview diagram showing icons of all user-selected database tables in the query, and all potential or selected valid table joins.

21. The method according to claim 15, further comprising a step for assisting the user in creating a user-defined table join by selecting elements from drop-down list boxes of an empty join grid row, and displaying said user-defined table join in the join grid and in the join overview diagram.

* * * * *